(12) United States Patent
Farah et al.

(10) Patent No.: US 8,437,459 B2
(45) Date of Patent: May 7, 2013

(54) CUSTOMIZED CALLER ID BASED UPON CALLED PARTY NUMBER

(75) Inventors: Jeffrey J. Farah, North Brunswick, NJ (US); Richard Palazzo, Phillipsburg, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

(21) Appl. No.: 13/615,870

(22) Filed: Sep. 14, 2012

(65) Prior Publication Data

US 2013/0003947 A1 Jan. 3, 2013

Related U.S. Application Data

(63) Continuation of application No. 11/800,255, filed on May 3, 2007, now Pat. No. 8,290,131.

(51) Int. Cl.
*H04M 1/64* (2006.01)

(52) U.S. Cl.
USPC .................. 379/142.06; 379/201.11; 455/415

(58) Field of Classification Search ............... 379/88.01, 379/142.01; 370/142.01–142.04; 455/412.2
See application file for complete search history.

(56) References Cited

U.S. PATENT DOCUMENTS

| | | | |
|---|---|---|---|
| 5,764,731 A | 6/1998 | Yablon | |
| 6,310,944 B1 * | 10/2001 | Brisebois et al. | 379/142.01 |
| 6,343,120 B1 * | 1/2002 | Rhodes | 379/142.01 |
| 6,463,138 B1 | 10/2002 | Sherwood et al. | |
| 6,700,957 B2 | 3/2004 | Horne | |
| 6,771,755 B1 * | 8/2004 | Simpson | 379/142.04 |
| 6,826,270 B1 | 11/2004 | Welch et al. | |
| 6,996,217 B2 | 2/2006 | Goldman | |
| 7,016,482 B2 | 3/2006 | Moss et al. | |
| 7,043,232 B2 | 5/2006 | Pelaez et al. | |
| 7,130,598 B2 | 10/2006 | Lee et al. | |
| 7,190,773 B1 | 3/2007 | D'Silva et al. | |
| 7,443,964 B2 * | 10/2008 | Urban et al. | 379/88.23 |
| 7,474,889 B2 * | 1/2009 | Bhakta et al. | 455/412.2 |

\* cited by examiner

*Primary Examiner* — Simon Sing
*Assistant Examiner* — Van D Huynh
(74) *Attorney, Agent, or Firm* — Cantor Colburn LLP

(57) ABSTRACT

A "customized" caller ID service platform is utilized within a telecommunications network (which may be the PSTN, an IP network, or any other network for supporting voice communication) to allow for the caller ID information transmitted to a called party to be tailored to the specific called party. A database within the platform is configured to store a listing of registered subscribers and a set of "pre-defined called numbers" associated with each subscriber. For each listed number, the subscriber provides the specific customized information (for example, an account number) that is to be transmitted to that specific called number as the caller ID information. A registered subscriber is able to gain access to the platform and modify the entries as need be.

10 Claims, 2 Drawing Sheets

CUSTOMIZED CALLER ID BASED UPON CALLED PARTY NUMBER

CROSS-REFERENCE TO RELATED APPLICATIONS

This application is a continuation of U.S. patent application Ser. No. 11/800,255 filed May 3, 2007, the contents of which are incorporated by reference herein in their entirety.

TECHNICAL FIELD

The present invention is related to providing caller identification information during set-up of a telephone call and, more particularly, to providing caller-defined information based upon the particular number being called, where the "number" may be a conventional telephone number, IP address, or any other data-equivalent address.

BACKGROUND OF THE INVENTION

In telephone systems, a system for transmitting caller identification information such as the caller's telephone number and/or name has been in existence for many years, and traditionally referred to as "caller ID" information. Individuals must subscribe to a caller ID service plan and configure their telephones with devices that display the caller ID information. If a telephone number is designated as a subscriber to caller ID, the telephone company sends a data packet relating to the identification of the caller while the telephone is ringing. The data packet is generated by the telephone company, who can identify the telephone number of a caller and the owner of that telephone number. The data packet is decoded by an external display device or an internal device within the telephone that displays the caller ID information. This service then allows the recipient to visually inspect the identification of the caller before deciding whether or not to answer the telephone.

U.S. Pat. No. 7,016,482 issued to J. W. Moss et al. on Mar. 21, 2006, discloses an improvement to the basic caller ID services by also transmitting the calling party's name within a customer group. In one embodiment of the invention, a user dials a destination telephone number. A call to the destination telephone is received at a service switching point and triggers a query to be sent to a switching control point. The switching control point performs a lookup in a caller number/name database. When the lookup system returns a caller name, a response is transmitted to the service switching point that includes the caller's name. The call to the destination telephone number is terminated, and the caller's name is forwarded as the caller ID information to the destination telephone number.

While the provision of the name information is useful, there are occasions where it would be desirable to be able to tailor the caller ID information on a called-number basis. For example, if an individual calls his local bank on a weekly basis to check an account balance, the use of caller ID information including his customer ID/bank account information would significantly increase the efficiency of the call, as well as limiting the number of prompts requiring input from the calling party. In another situation, an individual may need to contact a pharmacy regarding personal medications, again listening to and responding to a series of prompts. The ability to specifically define the call set-up information sent to the pharmacy to include prescription refill numbers when this call is initiated would again result in improved communication efficiency.

Therefore, while the provision of caller ID services has been beneficial in allowing a called party to recognize the "identity" of the calling party (either by name, calling telephone number, or both), a need remains to allow for an individual's "caller ID" information to be customized for pre-specified called numbers.

SUMMARY OF THE INVENTION

The need remaining in the art is addressed by the present invention, which relates to providing caller identification information during set-up of a telephone call and, more particularly, to providing caller-defined information based upon the particular contact number (i.e., telephone number, IP address) being called.

In accordance with the present invention, a "customized" caller ID service platform is utilized within a communication network (which may be the PSTN, an IP network, or any other network for supporting voice communication), where individuals may subscribe to this service and store in a database at the platform one or more personal, customized "caller IDs" and the pre-defined called telephone number(s) associated with each customized caller ID.

It is an aspect of the present invention that the subscription process is not based upon the specific telephone line that an individual may use. That is, the database does not rely on the ANI of the calling party line to perform the customized caller ID lookup. Therefore, a subscriber may utilize this service from virtually any telephone or other communication device at any location. All that is required is a subscriber ID (and possibly password) that would be used to gain access to the customized caller ID platform.

In a further aspect of the present invention, a registered subscriber is able to gain access to the platform (via a web/Internet connection, telephone connection, or the like) and modify his/her profile at will, e.g. changing existing entries, adding new entries and/or deleting entries, as the case may be.

Other and further features and aspects of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
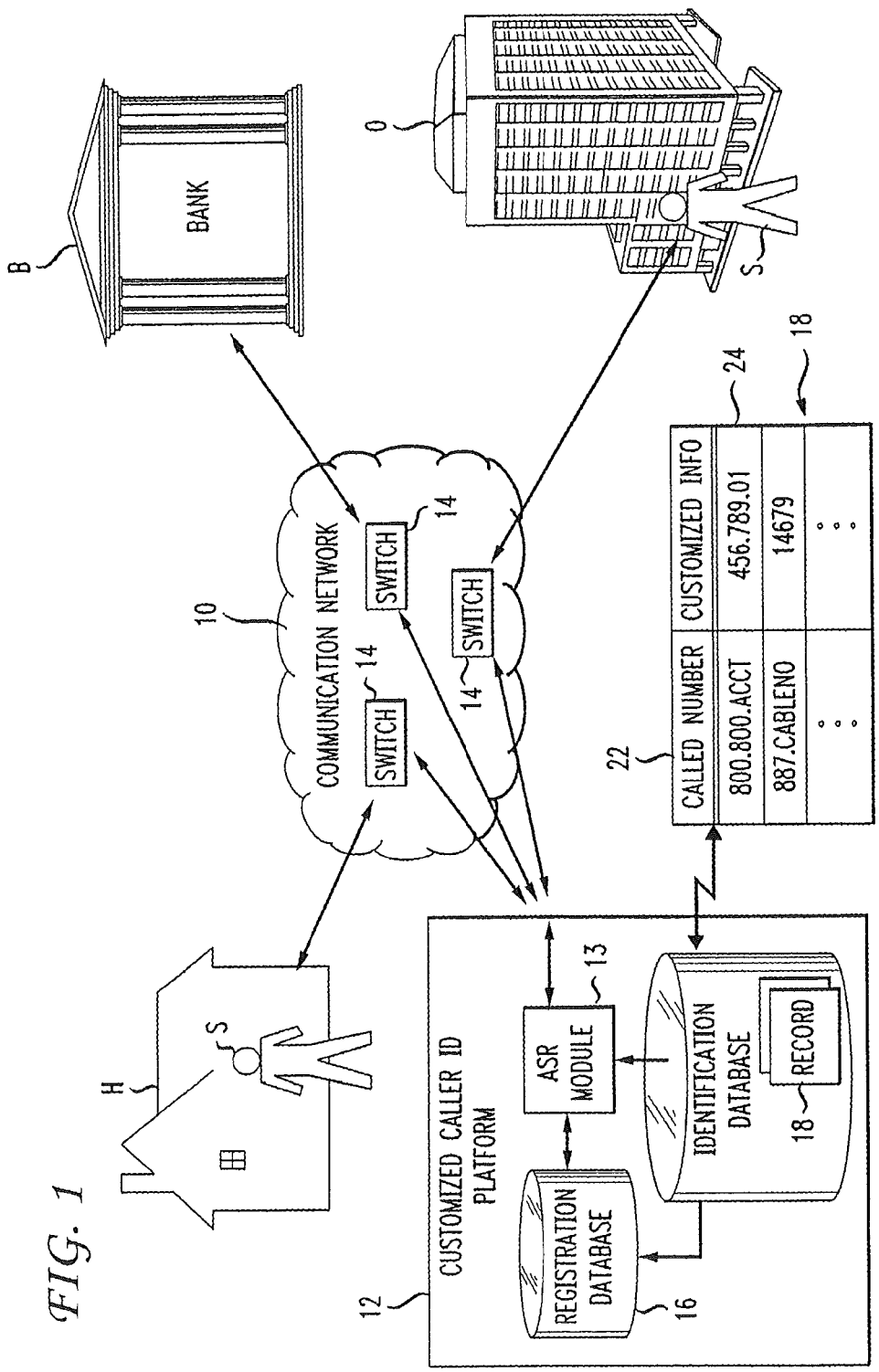
FIG. 1 is a simplified view of an exemplary communication network architecture within which the customized caller ID platform of the present invention may be utilized.

FIG. 1 illustrates an exemplary communication network 10, which may comprise the Public Switched Telephone Network (PSTN), the Internet Protocol (IP) network, or any other network able to support voice communication between subscribers. Thus, while the following discussion at times refers to placing and receiving traditional telephone calls (such as via the PSTN), it is to be understood that the utilization of customized caller ID in accordance with the present invention is equally applicable for use in association with "Voice over IP" (VoIP) communications. A customized caller ID platform 12 formed in accordance with the present invention is shown as interacting with various switches 14 in network 10 and functions to provide customized caller ID information as needed.

For the purposes of discussion, it will be assumed that an individual subscriber S has previously accessed platform 12 and has set up a table of customized caller ID numbers. In one embodiment of the present invention, an individual who has subscribed to this service will be given access to a web site where this information may be entered. Alternatively, the information may be given directly to an account representative associated with the service platform to perform the data entry, or utilizing a speech recognition system within an ASR module 13 within platform 12 to record a subscriber's information. A listing of registered subscribers, along with their associated subscriber ID information, is maintained within a subscriber registration database 16 within platform 12. Once registered, a subscriber is able to gain access to platform 12 and modify his listing of customized caller ID numbers—adding numbers, deleting numbers, modifying entries and the like. The data may be password-protected to provide additional security.

Regardless of the method used to provide/update the information, each individual subscriber S populates a record 18 within a customized caller identification database 20, as shown in FIG. 1. FIG. 1 includes an illustration of an exemplary record 18 which includes a linked pairing of pre-defined called numbers (shown in field 22) and the specific, customized identification information (shown in field 24) associated with that specific pre-defined called number. For example, a first pre-defined called number is shown as 800-800-ACCT, and may be the number that subscriber S calls to check his bank account balance. Thus, the "customized identification information" associated with the bank account called number is the subscriber's account information.

In use of the service of the present invention, when the subscriber places a call to his bank from his home location H, network 10 will first advance the call to caller ID platform 12 to determine if the individual is a registered subscriber. In one example, the subscriber will be prompted to entered his specific subscriber ID information (either "spoken" and applied as an input to ASR module 13, or via a keypad with the DTMF tones collected and used as the input). This information will be checked against the listing of all registered subscribers within database 16. If the just-entered subscriber ID information is not found, the call will be returned to switch 14 for conventional processing (and, perhaps, send a message back to the calling party stating that the subscriber ID information was not found).

If the individual is authenticated as a registered subscriber within database 16, the subscriber's ID will be used to access his record 18 of "customized caller ID" information within database 20 to determine if the called number is listed as one of the pre-defined called numbers. If the called number is not found, the call is again returned to switch 14 for conventional processing. In accordance with the present invention, if the called number matches one of the pre-defined called numbers, the associated customized caller identification information (in this case, the individual's bank account number) is retrieved from record 18. Thereafter, the specific information is inserted in the caller ID portion of the call set-up information and forwarded to network 10. Once the call is properly directed through switches 14 and arrives at bank location B, the customized caller identification information is captured and used to immediately direct a bank account representative (or automated system) to the proper customer record.

It is a significant aspect of the present invention that the customized caller ID service is not tied to the specific telephone line information (i.e., ANI) from which the call is originating. Historically, "caller ID" information comprised the CLID (calling line ID) and/or subscriber name associated with that calling line. It is important that a subscriber of the inventive service have access to the information stored in platform 12 from virtually any calling location/calling line number. That is, if subscriber S is currently at his office O and wants to check his bank balance, the call he places from office O needs to be directed to the same subscriber record 18 within database 20 at platform 12. Since the service of the present invention utilizes a subscriber ID, and not the ANI of the calling line, a subscriber call placed from office O will still allow subscriber S to gain access to his same subscriber record 18. Simply stated, the customized caller ID service of the present invention is independent of the originating calling line, and is instead a function of the individual placing the call.

A second entry this subscriber's record 18, as shown in FIG. 1, is an example where an individual has entered his cable service "trouble reporting" telephone number in field 22, in association with his account information. Thus, when calling about a problem with cable service, the service of the present invention will retrieve his account number from record 18 and forward this information in the caller ID field of the call set-up information passed to the cable company. As a result, the cable company account representative will immediately know the customer's account number as soon as the call is answered.

Figure 2:
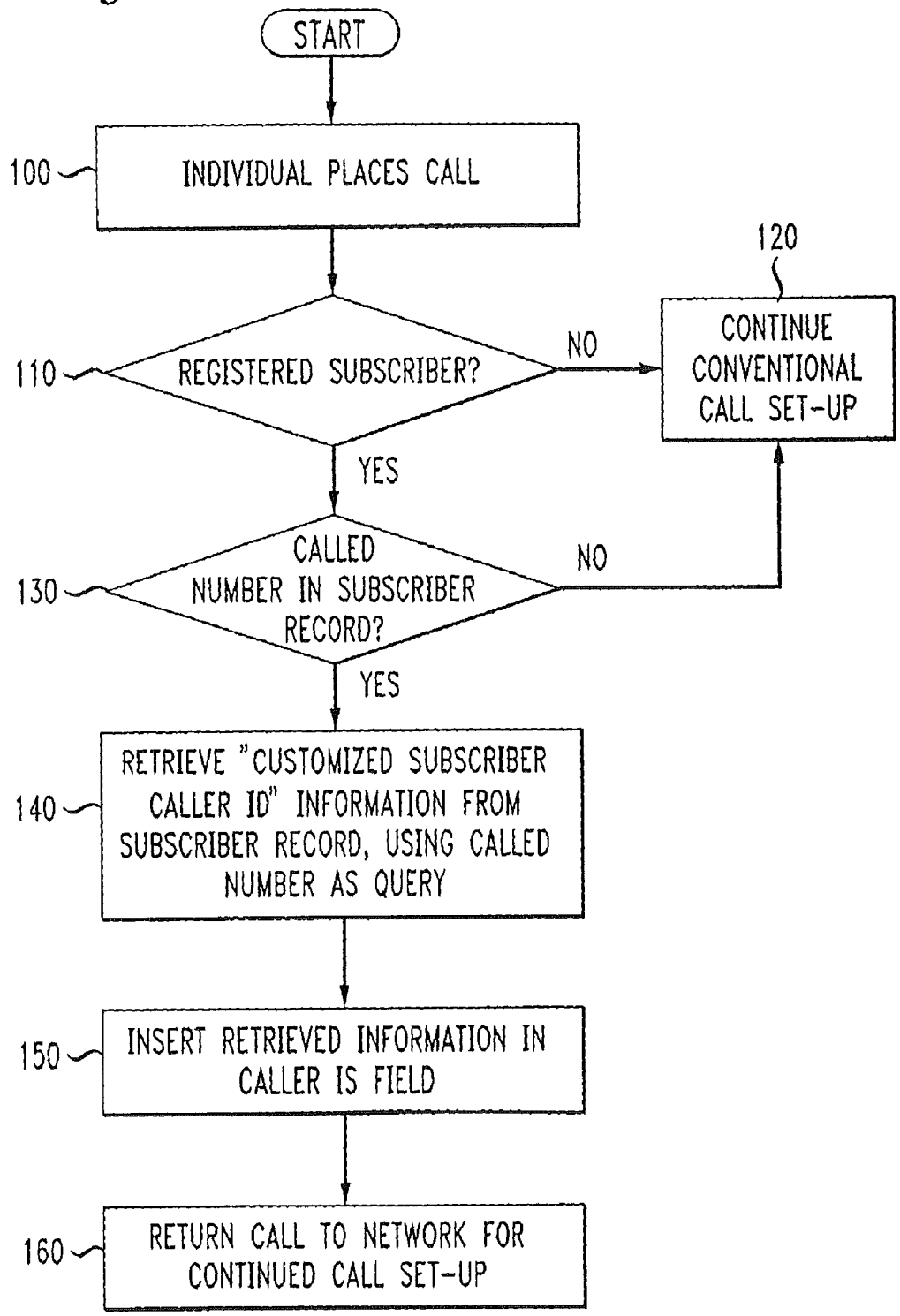
FIG. 2 is an exemplary flowchart illustrating the utilization of the customized caller ID service of the present invention.

FIG. 2 contains a flowchart illustrating an exemplary call flow invoking the customized caller ID service of the present invention. As shown, the process begins at step 100, within an individual placing a call to a specified called number. As discussed above, the service of the present invention is independent of the specific line that the individual is using to initiate the call. When the call is made, a first inquiry is performed, at step 110, to determine if the individual is a registered subscriber of the customized caller ID service. This inquiry may take the form of, for example, prompting the caller to enter a specific subscriber ID (and perhaps a password). Alternatively, the caller may be requested to utter a specific word or phrase to perform voice confirmation. It is to be understood that any suitable type of process known in art to validate/authenticate a calling party as a registered subscriber may be used in accordance with the present invention; no specific validation process is deemed to limit the scope hereof.

If no record of the individual is found within registered subscriber database 16, the call flow moves into a conventional call set-up process (step 120). Otherwise, if platform 12 does confirm that the individual is a registered subscriber, the process moves on to step 130, which checks the specific "called number" against the list of numbers stored in the subscriber's record 18. If no match is found (meaning that the called number is not one of the "pre-defined called" numbers with which the individual has populated the database), the process again moves to step 120 to continue with the conventional call set-up process.

If the called number is indeed found in subscriber's record 18, the associated "customized subscriber caller ID" information is retrieved (step 140) and inserted into the caller ID field of the signaling information (step 150). The now "customized" call set-up information is then returned to the network (step 160) for progression through the network to the called party.

The customized caller ID service of the present invention is thought to be particularly well-suited for customers who have accounts with companies or service providers (e.g., insurance companies, utilities, cable, etc.) and often become frustrated when contacting a certain business and having to repeat customer-identifying information (such as account information, telephone number, etc.). While a multi-level call prompting system may be used to route a caller to the most qualified customer service representation, the caller must still manually enter/speak their account information when the call is answered. Many times, after touring through the system prompts and finally speaking to a representative, that person will again ask for your account number. The customized caller ID service of the present invention allows the subscriber to "push" the proper customer identification information automatically to the customer service representative via caller ID. This universal customized caller ID is considered to be applicable for implementation in the traditional telecommunications network (PSTN) or IP networks (VoIP communication), in both wireline and wireless applications.

Indeed, it is to be understood that the present invention may be embodied in other specific forms without departing from its spirit or essential characteristics. The described embodiments are to be considered in all respects as illustrative only, and not restrictive. The scope of the invention is, therefore, indicated by the appended claims rather than by the foregoing description. All changes that come within the meaning and range of equivalency of the claims are to be embraced within their scope.

What is claimed is:

1. A customized caller ID service platform for providing, in a communication network, customized calling party identification information to a called party via a customized caller ID service, the platform comprising:
   a subscriber database for storing validation information associated with each registered subscriber of the customized caller ID service; and
   a customized caller identification information database including a plurality of subscriber records, each subscriber record including a plurality of linked pairs of subscriber-defined called numbers and specific, customized subscriber-defined identification information to be transmitted as caller ID information to each subscriber-defined called number, with each subscribed-defined called number linked to its own specific, customized subscriber-defined identification information;
   wherein the platform is disposed within the communication network;
   wherein the validation information stored within the subscriber database includes subscriber identification information.

2. The customized caller ID service platform as defined in claim 1 wherein the communication network is a public switched telephone network.

3. The customized caller ID service platform as defined in claim 1 wherein the communication network is an IP network.

4. The customized caller ID service platform as defined in claim 1 further comprising an automated speech recognition module for receiving spoken information from a subscriber and translating the spoken information into data acceptable for storing in the subscriber database and the customized caller identification information database.

5. The customized caller ID service platform as defined in claim 1 wherein the validation information further comprises a password associated with the subscriber identification information.

6. The customized caller ID service platform as defined in claim 1 wherein the customized caller identification information database is accessible by registered subscribers for modifying contents of a subscriber record.

7. The customized caller ID service platform as defined in claim 6 wherein a registered subscriber modifies the subscriber record through a web-based interface.

8. The customized caller ID service platform as defined in claim 6 wherein a registered subscriber utilizes an electronic communication device to modify the subscriber record.

9. A method of providing customized caller ID information during set-up of a call to a called number, the method comprising:
   creating a customized caller ID database of registered caller ID service subscribers, each subscriber record including a plurality of pre-defined called numbers, linked in a one-to-one relationship with a plurality of specific, customized caller identification information, each called number associated with different specific, customized caller identification information;
   determining if the called number is stored within the customized caller ID database of pre-defined called numbers;
   when the called number is not stored within the customized caller ID database of pre-defined called numbers, proceeding with conventional call set-up;
   when the called number is stored within the customized caller ID database of pre-defined called numbers, then
      retrieving the specific, customized caller identification information associated with the called number in the customized caller ID database;
      transmitting the specific, customized caller identification information to the called number during the call set-up process; and
   enabling registered subscribers to access the customized caller ID database for modifying a subscriber record;
   wherein the modifying includes adding a new pre-defined calling number and associated customized caller identification information;
   wherein the modifying includes deleting an existing pre-defined calling number and associated customized caller identification information.

10. The method of claim 9 wherein the modifying includes changing data within an existing pre-defined calling number and associated customized caller identification information.

* * * * *